United States Patent Office.

IMPROVEMENT IN DYEING AND PRINTING TEXTILE FABRICS AND YARNS.

ALFRED PARAF, OF MULHOUSE, FRANCE.

Letters Patent No. 60,546, dated December 18, 1866.

The Schedule referred to in these Letters Patent and making part of the same.

TO ALL WHOM IT MAY CONCERN:

Be it known that I, ALFRED PARAF, of the city of Mulhouse, in the empire of France, chemist, at present temporarily residing at Manchester, England, have invented new and useful "Improvements in Dyeing and Printing Textile Fabrics and Yarns;" and I do hereby declare that the following is a full and exact description thereof.

Chromic acid has only hitherto been used as an oxydizing agent in dyeing and printing in the state of bichromates or chromates of the alkaline earth, which are soluble at ordinary temperatures; and as the chromic acid is almost immediately evolved from such salts when they are put in contact with colors or bodies to oxydize, and forms immediately the insoluble color wanted in the fibre, it could not be used in one operation, but had always to be either first fixed in the fibre and afterwards passed through the coloring matter, or the coloring matter had to be fixed first in the fibre and then oxydized in passing through a solution of the chromate or bichromate.

My invention consists in the process of applying chromic acid in dyeing and printing operations, by the use of insoluble combinations of chromium or insoluble chromate salts, capable of evolving chromic acid, either slowly, in the presence of a moist atmosphere, or by ageing or steaming. The invention is of great utility in the production of aniline or its analogous black or grey colors, and for the discharge of madder reds and similar colors. For the former purpose, I mix a salt of aniline, and the brown binoxide of chromium or the chromate of chromium and manganese, either alone or in conjunction with a chlorate; such, for example, as the chlorate of potash or of soda, and such mixtures printed upon cloth produce fast aniline black by ageing. In order to obtain the brown binoxide of chromium, I use the following method: I prepare a solution of chloride of chromium in water, using such proportions as to make the density 20° Twaddle's scale; I also prepare a saturated solution of chromate of potash in water, and render it slightly alkaline by the addition of caustic soda. I add the latter solution to the former until precipitation ceases. The chocolate-colored precipitate so produced is filtered from the liquor and washed; it is permitted to remain on the filter about two days, and is then mixed with from three to five per cent. of its weight of glycerine. The moist mass thus produced is termed by me oxydizing paste, or sometimes brown binoxide of chromium in paste. If I wish to prepare the compound chromate of chromium and manganese, I proceed in the same manner as above set forth, using one equivalent of chlorate of chromium and one equivalent of chlorate of manganese in place of chloride of chromium, alone, in preparing the first solution, to which the second is added. The product I sometimes term oxydizing paste and sometimes the chromate of chromium and manganese in paste. For printing, the following proportions have given me very good results: first, twelve ounces of chloride of aniline, three pounds of water, and one pound of starch boiled together; secondly, eighteen ounces of brown binoxide of chromium in paste, or chromate of chromium and manganese in paste, seven ounces of chlorate of potash, to one gallon of thickening (composed of starch and water in the proportions of a pound of starch to a gallon of water.) Color for printing: one part of the first mixture and one part of the second mixture, to be mixed when cold. In place of the above, the following proportions may be used in printing: First, twelve ounces of aniline salt, (chloride of aniline;) six pounds of water; one and a half pounds starch; one pound brown British gum paste; three-quarters of a pound of gum dragon paste; three and a half ounces chlorate of potash; seven ounces of glycerine. Second, ten ounces oxydizing paste. Boil the first, and after it is quite cold, add the second. The goods are printed with either of the above mixtures in the ordinary way; then they are to be aged by being hung up in a room, which is both warm and damp, until the color becomes of a dark green, after which the color is to be raised to black by the usual process employed in calico printing for such purpose. The temperature of the rooms should be about 90° Fahrenheit, and the dampness should be about 95° of the hygrometer ordinarily used in the ageing rooms of print works; the warmth hastens the operation but does not appear to be essential. But if I want to dye or print very heavy objects, I can easily produce the necessary quantity of chromate of chromium and manganese in the fibre, by padding or dyeing first in a solution of a mixture of equal parts of chloride of manganese and of chloride of chromium, then passing the goods, without washing, through a solution of mono-chromate of potash, then wash well and dye in a solution of a salt of aniline, containing about two per cent. of chlorate of potash or soda; dry, and hang up in a warm, damp room, as before described, till a very dark green shade appears, and then raise the black as the printed black. The chlorate hastens the production of the color, but the binoxide of chromium or chromate of chromium and manganese, and the salt of aniline, will produce blacks without the chlorate. I have mentioned the binoxide of chromium, and the chromate of chromium, and manganese, because these give very good results, but I would have it understood that I claim the use of all the insoluble chrome salts, which are capable of evolving chromic acid in the conditions above mentioned, and therefore can be used as oxydizing agents, either with the coloring matter to oxydize, or by being precipitated in the cloth or yarn, and then dyed in an aniline salt solution or printed upon with a thickened aniline salt. The following are examples of such chrome salts: the chromate of chromium, (hereinbefore called binoxide of chromium,) the dichromate of lead, and the chromate of chromium and manganese. These may be used as above described to develop chromic acid in the goods or fabric: first, for the production of aniline blacks or other alkaloides colors; secondly, for the discharge of madder reds or similar colors; and in all cases or processes of dyeing and printing, where the chromic acid so developed could be useful. For the discharge of madder reds and similar colors, the fabric may be first dyed with the color in the usual way, then printed with a compound mixture of the oxydizing paste, and the chlorate with thickening, (such as has been hereinbefore described,) and lastly hung up in a warm, damp room.

What I claim as my invention, and desire to secure by Letters Patent, is—

The process of developing chromic acid in dyeing and printing operations, by the application to the fabric of an insoluble salt of chromium and the subsequent action of a moist atmosphere, substantially as set forth.

Done at Manchester, England, this 13th day of June, 1866.

ALFRED PARAF.

Witnesses:
 EDWARD JOSEPH HUGHES, Patent Agent, 20 Cross street, Manchester,
 JOHN BLOODWORTH, Patent Agent, 20 Cross street, Manchester.